(12) United States Patent
Oobayashi et al.

(10) Patent No.: US 9,164,512 B2
(45) Date of Patent: Oct. 20, 2015

(54) AUTONOMOUS MOVING BODY AND CONTROL METHOD THEREOF

(75) Inventors: Souichi Oobayashi, Komaki (JP); Hidenori Yabushita, Toyota (JP); Takashi Ogura, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 163 days.

(21) Appl. No.: 13/126,860

(22) PCT Filed: Nov. 27, 2009

(86) PCT No.: PCT/JP2009/006429
§ 371 (c)(1),
(2), (4) Date: Apr. 29, 2011

(87) PCT Pub. No.: WO2011/064821
PCT Pub. Date: Jun. 3, 2011

(65) Prior Publication Data
US 2012/0035797 A1 Feb. 9, 2012

(51) Int. Cl.
*G08G 1/16* (2006.01)
*G05D 1/02* (2006.01)

(52) U.S. Cl.
CPC .............. *G05D 1/0274* (2013.01); *G05D 1/024* (2013.01); *G05D 1/0214* (2013.01); *G05D 1/0272* (2013.01); *G05D 1/0242* (2013.01); *G05D 1/0255* (2013.01)

(58) Field of Classification Search
USPC ............................................. 701/23; 700/258
See application file for complete search history.

(56) References Cited

U.S. PATENT DOCUMENTS 5,390,125 A * 2/1995 Sennott et al. ................ 701/472
5,610,815 A * 3/1997 Gudat et al. .................... 701/23
(Continued)

FOREIGN PATENT DOCUMENTS

JP 6234784 A 2/1987
JP 05-127747 A 5/1993
(Continued)

OTHER PUBLICATIONS

International Search Report dated Mar. 9, 2010.
(Continued)

*Primary Examiner* — John R Olszewski
*Assistant Examiner* — Jean-Paul Cass
(74) *Attorney, Agent, or Firm* — Kenyon & Kenyon LLP (57) ABSTRACT

To enable stable collision avoidance operation without the need to install an infrastructure or the like even in a dangerous area where running out is likely to occur. An autonomous moving body according to the present invention includes: a distance measuring sensor that measures a distance to an object existing in an environment; a distance information acquisition unit that acquires a distance measurement value of the distance measuring sensor as distance information on a measurement point; and a dangerous area extraction unit that categorizes adjacent measurement points as an identical object according to a distance difference between the measurement points, and extracts an endpoint of the object as a dangerous area when the categorized object itself has a size equal to or larger than a predetermined threshold and when an opening formed between endpoints of the objects has a width equal to or larger than a predetermined threshold, in which the autonomous moving body travels so as to avoid a collision in the extracted dangerous area.

10 Claims, 10 Drawing Sheets

(56) References Cited

U.S. PATENT DOCUMENTS

| | | |
|---|---|---|
| 5,625,559 A | 4/1997 | Egawa |
| 6,067,572 A | 5/2000 | Jensen et al. |
| 6,098,107 A | 8/2000 | Narvaez-Guarnieri et al. |
| 6,212,443 B1* | 4/2001 | Nagata et al. ............... 700/245 |
| 6,236,360 B1* | 5/2001 | Rudow et al. ............ 342/357.25 |
| 6,604,005 B1 | 8/2003 | Dorst et al. |
| 6,678,582 B2* | 1/2004 | Waled ......................... 700/245 |
| 6,904,335 B2* | 6/2005 | Solomon ...................... 700/247 |
| 7,079,943 B2 | 7/2006 | Flann et al. |
| 7,398,136 B2 | 7/2008 | Higaki et al. |
| 7,539,563 B2* | 5/2009 | Yang et al. ..................... 701/24 |
| 7,584,020 B2* | 9/2009 | Bruemmer et al. ............ 700/245 |
| 7,620,477 B2* | 11/2009 | Bruemmer ..................... 700/245 |
| 7,684,894 B2 | 3/2010 | Sakai et al. |
| 7,742,841 B2* | 6/2010 | Sakai et al. .................. 700/255 |
| 7,844,393 B2 | 11/2010 | Takizawa |
| 7,869,946 B2 | 1/2011 | Couckuyt et al. |
| 7,957,837 B2* | 6/2011 | Ziegler et al. ................ 700/258 |
| 7,979,174 B2* | 7/2011 | Fregene et al. ................. 701/23 |
| 8,060,271 B2* | 11/2011 | Dolgov et al. .................. 701/28 |
| 8,078,399 B2* | 12/2011 | Ariyur et al. .................. 701/411 |
| 8,121,749 B1* | 2/2012 | Agrawal et al. ................. 701/23 |
| 8,442,714 B2* | 5/2013 | Matsukawa et al. ............ 701/26 |
| 8,520,695 B1* | 8/2013 | Rubin et al. .................. 370/445 |
| 2004/0117079 A1 | 6/2004 | Hulden |
| 2004/0158355 A1* | 8/2004 | Holmqvist et al. ............ 700/245 |
| 2004/0193365 A1 | 9/2004 | Kokojima et al. |
| 2006/0095170 A1* | 5/2006 | Yang et al. ..................... 701/23 |
| 2006/0149465 A1 | 7/2006 | Park et al. |
| 2006/0167601 A1 | 7/2006 | Henning et al. |
| 2007/0276541 A1 | 11/2007 | Sawasaki |
| 2008/0009965 A1* | 1/2008 | Bruemmer et al. ............ 700/245 |
| 2008/0009966 A1* | 1/2008 | Bruemmer et al. ............ 700/245 |
| 2008/0059015 A1* | 3/2008 | Whittaker et al. .............. 701/23 |
| 2009/0018712 A1* | 1/2009 | Duncan et al. ..................... 701/2 |
| 2009/0043440 A1 | 2/2009 | Matsukawa et al. |
| 2009/0043489 A1 | 2/2009 | Weidner |
| 2009/0069938 A1* | 3/2009 | Nishimura et al. ........... 700/255 |
| 2009/0105939 A1* | 4/2009 | Dolgov et al. ................ 701/201 |
| 2009/0192683 A1* | 7/2009 | Kondou et al. .................. 701/53 |
| 2009/0306881 A1* | 12/2009 | Dolgov et al. ................ 701/200 |
| 2010/0082194 A1* | 4/2010 | Yabushita et al. .............. 701/25 |
| 2010/0283632 A1* | 11/2010 | Kawabata et al. ......... 340/932.2 |
| 2011/0054689 A1* | 3/2011 | Nielsen et al. ................ 700/258 |
| 2012/0083960 A1* | 4/2012 | Zhu et al. ........................ 701/23 |

FOREIGN PATENT DOCUMENTS

| | | |
|---|---|---|
| JP | 06-138941 A | 5/1994 |
| JP | 06-265637 A | 9/1994 |
| JP | 06289929 A | 10/1994 |
| JP | 07104062 A | 4/1995 |
| JP | 09251320 A | 9/1997 |
| JP | 2001324343 A | 11/2001 |
| JP | 2002-287824 A | 10/2002 |
| JP | 2004-157829 A | 6/2004 |
| JP | 2004299001 A | 10/2004 |
| JP | 2005032196 A | 2/2005 |
| JP | 2006-163558 A | 6/2006 |
| JP | 3879860 B | 11/2006 |
| JP | 2007213111 A | 8/2007 |
| JP | 2007-249632 A | 9/2007 |
| JP | 2009-042845 A | 2/2009 |
| WO | WO2008005661 * | 9/2009 |

OTHER PUBLICATIONS

W. Yang et al., "A quick intelligent control system for a mobile robot to avoid collision with moving obstacles," Microsyst. Technol. (2005) 11: 569-576.
Office Action dated Oct. 4, 2011 in U.S. Appl. No. 12/442,234.
Office Action dated Mar. 15, 2012 in U.S. Appl. No. 12/442,234.
Office Action dated May 1, 2013 in U.S. Appl. No. 12/866,555.
Office Action dated Jan. 25, 2013 in U.S. Appl. No. 12/866,555.
Office Action dated Aug. 22, 2012 in U.S. Appl. No. 12/866,555.
Office Action dated Mar. 28, 2012 in U.S. Appl. No. 12/866,555.

* cited by examiner

AUTONOMOUS MOVING BODY AND CONTROL METHOD THEREOF

This is a 371 national phase application of PCT/JP2009/006429 filed 27 Nov. 2009, the content of which is incorporated herein by reference.

TECHNICAL FIELD

The present invention relates to an autonomous moving body that autonomously travels in an environment including a dangerous area where running out is likely to occur, for example, and a control method thereof.

BACKGROUND ART

Robots that autonomously move in an environment have been developed. The environment where robots move includes a dangerous area, such as an intersection, where a person or a moving obstacle is likely to run out in front of the robots. In the case of entering such a dangerous area, some robots detect a person or a moving obstacle by using an external sensor mounted therein and start deceleration to avoid a collision after the detection. Such robots may collide with a person or a moving obstacle running out in front of the robots, due to a delay of a collision avoidance operation. In view of this, autonomous mobile robots are required to perform a safe travel control to avoid a collision in the dangerous areas where running out is likely to occur.

Patent Literature 1 discloses a technique for preventing deceleration to avoid contact with surrounding walls during movement along a narrow passage. In Patent Literature 1, a sensor monitoring range for determining the necessity of deceleration is dynamically changed based on information about infrastructure installed in advance in areas in the vicinity of intersections.

Further, Patent Literatures 2 to 5 disclose other techniques related to the present invention. For example, Patent Literature 2 discloses an obstacle avoidance apparatus that detects a risk level of an obstacle at every predetermined prediction time, and travels to a destination while avoiding a risk according to the risk level. Furthermore, Patent Literature 3 discloses a collision prevention operating method for an unmanned self-traveling body which determines whether positional data of another unmanned self-traveling body is included in an area, and controls the unmanned self-traveling body to stop when the positional data is included in a stop area, and to decelerate when the positional data is included in a deceleration area.

CITATION LIST

Patent Literature

[Patent Literature 1] Japanese Unexamined Patent Application Publication No. 2009-042845
[Patent Literature 2] Japanese Unexamined Patent Application Publication No. 06-138941
[Patent Literature 3] Japanese Unexamined Patent Application Publication No. 05-127747
[Patent Literature 4] Japanese Unexamined Patent Application Publication No. 2002-287824
[Patent Literature 5] Japanese Unexamined Patent Application Publication No. 06-265637

SUMMARY OF INVENTION

Technical Problem

However, in the related art disclosed in Patent Literature 1, for example, an infrastructure such as a marker for detecting a dangerous area such as an intersection is installed in the environment in advance, and the dangerous area is recognized using information about the infrastructure. That is, the dangerous area where running out is likely to occur is detected not by the function of the autonomous mobile robot itself. Thus, it is necessary to install an infrastructure such as a marker in advance in the environment. This results in a problem that it costs a great deal to install the infrastructure in the practical use.

An object of the present invention is to provide an autonomous moving body capable of performing a collision avoidance operation with stability, without the need to install an infrastructure or the like even in a dangerous area where a person or a moving obstacle is likely to run out, and a control method thereof.

Solution to Problem

An autonomous moving body according to the present invention is an autonomous moving body that autonomously travels from a travel start point to a travel end point in an environment, including: a distance measuring sensor that measures a distance to an object existing in the environment; a distance information acquisition unit that acquires a distance measurement value of the distance measuring sensor as distance information on a measurement point; and a dangerous area extraction unit that categorizes adjacent measurement points as an identical object according to a distance difference between the measurement points, and extracts an endpoint of the object as a dangerous area when the categorized object itself has a size equal to or larger than a predetermined threshold and when an opening formed between endpoints of the objects has a width equal to or larger than a predetermined threshold, in which the autonomous moving body travels so as to avoid a collision in the extracted dangerous area.

In the autonomous moving body, a running-out dangerous area is estimated using the measured value of the distance measuring sensor, and a collision avoidance operation, such as deceleration when entering the dangerous area or creation of a path for avoiding the dangerous area, is carried out. This makes it possible to stably avoid a collision with a moving obstacle without the need to install an infrastructure or the like even in the running-out dangerous area.

Further, the dangerous area extraction unit may determine whether the distance difference between the adjacent measurement points is equal to or larger than a threshold that increases as a distance from the autonomous moving body, and may categorize the adjacent measurement points as the identical object when the distance difference is smaller than the threshold. Thus, objects can be categorized more satisfactorily, thereby making it possible to suppress generation of an unnecessary avoidance operation and to perform more stable traveling.

Furthermore, assuming that the endpoint of the object extracted as the dangerous area is a dangerous candidate area, the dangerous area extraction unit may determine whether an angle formed between a straight line connecting the dangerous candidate area as a base point and another endpoint of the identical object and a traveling direction of the autonomous moving body is equal to or larger than a predetermined threshold, and may extract the dangerous candidate area as a dangerous area when the angle is equal to or larger than the predetermined threshold. Thus, the dangerous area can be determined more satisfactorily, thereby making it possible to suppress generation of an unnecessary avoidance operation and to perform more stable traveling.

Further, the autonomous moving body may further include a safe speed selection unit that selects a traveling speed to decelerate according to a relative distance between the dangerous area and a position of the autonomous moving body when the autonomous moving body enters the dangerous area extracted by the dangerous area extraction unit. The autonomous moving body may enter the dangerous area according to the traveling speed selected by the safe speed selection unit. Thus, a collision can be avoided more safely even in the case of entering the dangerous area.

Furthermore, the autonomous moving body may further include a path planning unit that creates a path from the travel start point to the travel end point. When the autonomous moving body travels to avoid the dangerous area extracted by the dangerous area extraction unit, the path planning unit may create a path for avoiding the dangerous area using map information reflecting the dangerous area, and the autonomous moving body may travel along the created path. Thus, the autonomous moving body can avoid the dangerous area and can travel safely and efficiently.

Further, the autonomous moving body may further include: a safe speed selection unit that selects a traveling speed to decelerate according to a relative distance between the dangerous area extracted by the dangerous area extraction unit and a position of the autonomous moving body; and a path planning unit that creates a path from the travel start point to the travel end point. When the autonomous moving body approaches the dangerous area, the autonomous moving body may enter the dangerous area according to the traveling speed selected by the safe speed selection unit, or may travel along the path for avoiding the dangerous area, the path being created by the path planning unit. Thus, when the dangerous area is extracted, the avoidance operation can be performed more satisfactorily.

A control method according to the present invention is a control method for an autonomous moving body including a distance measuring sensor that measures a distance to an object existing in an environment, the control method including: acquiring a distance measurement value of the distance measuring sensor as distance information on a measurement point; categorizing adjacent measurement points as an identical object according to a distance difference between the measurement points; extracting an endpoint of the object as a dangerous area when the categorized object itself has a size equal to or larger than a predetermined threshold and when an opening formed between endpoints of the objects has a width equal to or larger than a predetermined threshold; and performing a travel control to avoid a collision in the extracted dangerous area.

In the control method, a running-out dangerous area is estimated using the measured value of the distance measuring sensor, and a collision avoidance operation, such as deceleration when entering the dangerous area or creation of a path for avoiding the dangerous area, is carried out. This makes it possible to stably avoid a collision with a moving obstacle without the need to install an infrastructure or the like even in the running-out dangerous area.

Advantageous Effects of Invention

According to the present invention, it is possible to provide an autonomous moving body capable of performing a stable collision avoidance operation without the need to install an infrastructure or the like even in the dangerous area where a person or a moving object is likely to run out, and a control method thereof.

DESCRIPTION OF EMBODIMENTS

First Embodiment

Figure 1A:
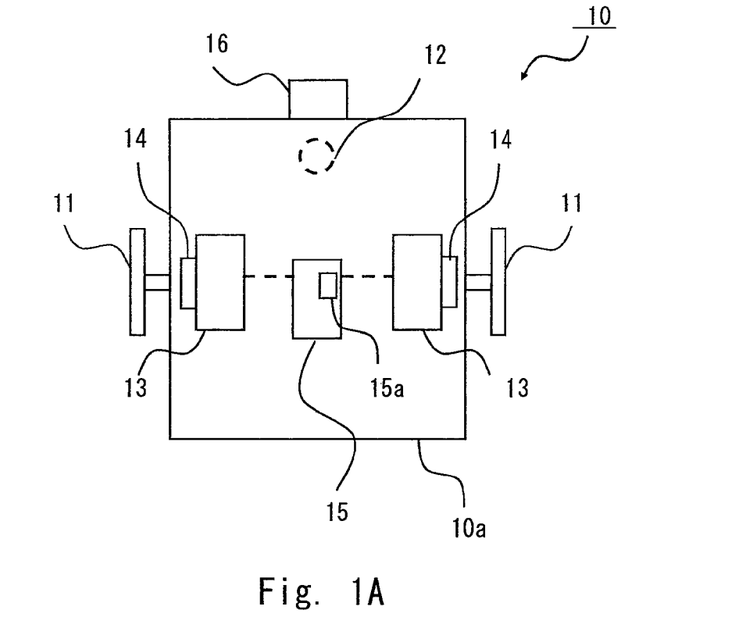
FIG. 1A is a diagram showing a structure of an autonomous moving body according to a first embodiment.
Figure 1B:
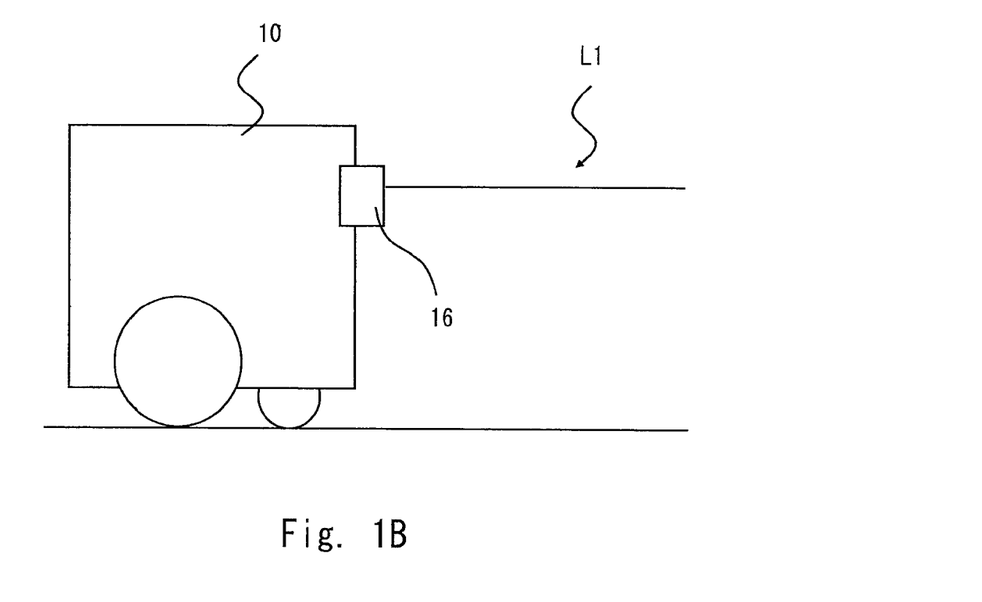
FIG. 1B is a side view of an autonomous moving body according to the first embodiment.

Hereinafter, embodiments of the present invention will be described with reference to the drawings. FIGS. 1A and 1B show a vehicle serving as an autonomous moving body according to this embodiment. FIG. 1A is a diagram showing a schematic functional structure of a vehicle 10, and FIG. 1B is a side view of the vehicle 10. In an environment where the vehicle 10 travels, there exist well-known stationary obstacles, stationary obstacles and moving obstacles detected by a distance measuring sensor, and the like. The vehicle 10 needs to avoid these obstacles.

As shown in FIG. 1A, the vehicle 10 is an opposed-two-wheel type vehicle including a box-shaped vehicle body 10a, a pair of opposed right/left drive wheels L11, and a caster 12, in which the vehicle body 10a is horizontally supported by the right/left drive wheels L11 and the auxiliary wheel 12. Further, inside the vehicle body 10a, there are provided drive units (motors) 13 that drive the right/left drive wheels L11, respectively, encoders 14 for detecting the number of revolutions of the drive wheels, and a control unit 15 that produces a control signal for driving the drive wheels and transmits the control signal to the drive units 13. A storage area 15a, such as a memory, which is provided as a storage unit inside the control unit 15, stores a control program for controlling a traveling speed, a traveling direction, a traveling distance, and the like of the vehicle 10 based on the control signal. The above-mentioned traveling speed, traveling distance, and the like are obtained based on the number of revolutions of the right/left drive wheels L11 detected by the encoders 14.

A non-contact type distance measuring sensor 16 for recognizing an obstacle or the like appearing in the traveling direction is fixed onto the front surface of the vehicle body 10a. Information about an object or the like recognized by the distance measuring sensor 16 is input to the control unit 15, with the result that the traveling direction, the traveling speed, and the like of the vehicle 10 are determined in accordance with the control program. The distance measuring sensor 16 may be constructed by, for example, an optical scanning type sensor (such as a laser range finder) that detects a laser beam reflected by an obstacle or the like. Note that the distance measuring sensor 16 is not limited to the laser range finder, and a non-contact type sensor such as an infrared ray sensor or an ultrasonic sensor may also be used.

As shown in FIG. 1B, the laser range finder serving as the distance measuring sensor 16 is provided at an upper part of the front surface of the vehicle body 10a. In this embodiment, the distance measuring sensor 16 is disposed such that the direction of a laser beam L1 to be irradiated becomes substantially horizontal. The distance measuring sensor 16 measures a distance between an object existing in a detection area in the vicinity of the vehicle 10 and the vehicle 10. The distance measuring sensor 16 radially irradiates laser beams onto the detection area in front of the vehicle 10, and receives light reflected from the object existing in the detection area, thereby enabling measurement of the distance to the object.

The vehicle 10 structured as described above controls the drive amount of the pair of right/left drive wheels L11 independently, thereby enabling movement operation such as straight traveling, curved traveling (turning), backward traveling, and pinwheeling (pivotal movement centered on the midpoint between the drive wheels). Further, the vehicle 10 arrives at a specified destination in a moving environment by creating a traveling path to the destination and moving so as to track the traveling path according to a command from the control unit 15 that specifies an externally-supplied destination place.

The storage area 15a included in the control unit 15 stores map information. As the map information, a grid map is herein stored. The grid map is obtained by virtually depicting grid lines connecting grid points arranged at substantially regular intervals "d" (e.g., 10 cm) in the shape of the entire moving environment on a floor. Obstacle information indicating the presence or absence of an obstacle is set to each grip in advance or in real time. Assuming that the self position specified on the grid map is a travel start point, the control unit 15 creates a traveling path to a travel end point which is a destination. The autonomous moving body travels along the created traveling path.

Figure 2:
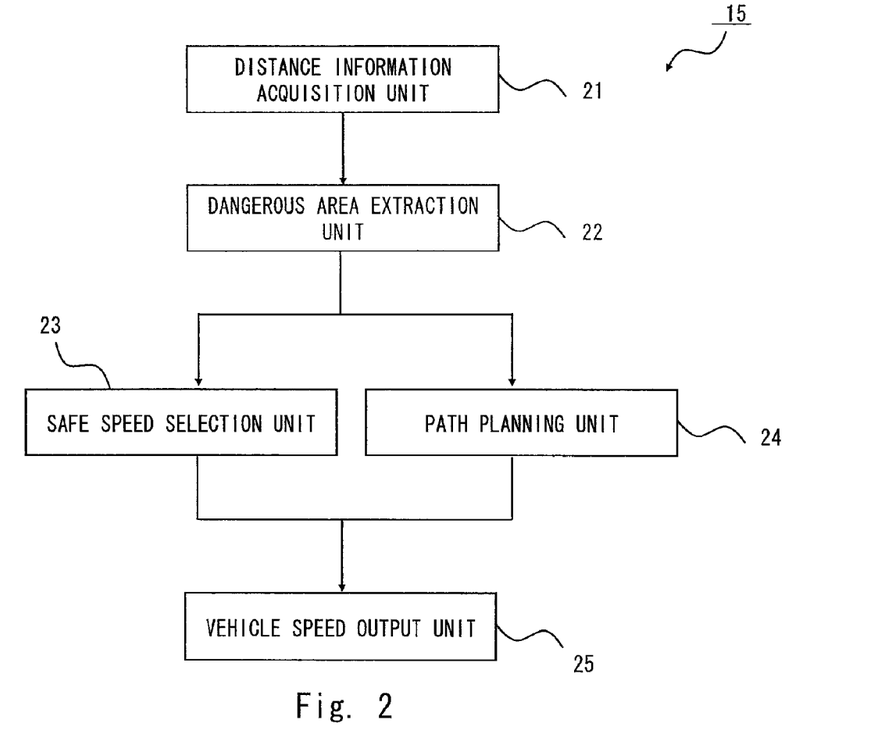
FIG. 2 is a block diagram showing a functional structure of a control unit according to the first embodiment.

FIG. 2 is a block diagram showing a functional structure of the control unit. As shown in the figure, the control unit 15 includes a distance information acquisition unit 21, a dangerous area extraction unit 22, a safe speed selection unit 23, a path planning unit 24, and a wheel speed output unit 25.

The distance information acquisition unit 21 acquires a measured value of a distance to an object measured by the distance measuring sensor 16 as distance information on each measurement point.

The dangerous area extraction unit 22 extracts a dangerous area based on the distance information acquired by the distance information acquisition unit 21. More specifically, adjacent measurement points are categorized as an identical object according to a distance difference between the measurement points. When the object of interest itself has a size equal to or larger than a predetermined threshold and when an opening formed between the endpoint of the object of interest and the endpoint of another object has a width equal to or larger than a predetermined threshold, the endpoint of the object of interest is extracted as a dangerous area. Examples of the dangerous area include not only an intersection but also a doorway of a room, a shadowed area of an opened door, and an area on the back side of a corner which is out of sight of the vehicle 10. In such dangerous areas, a moving obstacle such as a person is likely to run out. Details of a dangerous area extraction process will be described later.

The safe speed selection unit 23 selects a safe traveling speed when the vehicle 10 enters the dangerous area extracted by the dangerous area extraction unit 22. As described later, a traveling speed to decelerate according to a relative distance between the dangerous area and the position of the vehicle 10 is selected as the safe traveling speed.

The path planning unit 24 creates a path from a travel start point to a travel end point. As described later, in the case of traveling while avoiding the dangerous area extracted by the dangerous area extraction unit 22, the path planning unit 24 creates an avoidance path from a travel start point to a travel end point by reflecting the dangerous area in the map information.

The wheel speed output unit 25 controls the driving of the right/left drive wheels L11 based on the speed selected by the safe speed selection unit 23 and the path created by the path planning unit 24. As described later, when the dangerous area is extracted during the travel toward the travel end point along the created path, the vehicle 10 decelerates toward the dangerous area, thereby avoiding a collision in the dangerous area. Alternatively, when the dangerous area is extracted, a path for avoiding the dangerous area may be created so that the vehicle 10 can travel along the created path. More alternatively, a combination thereof may be used to allow the vehicle to accelerate or decelerate after creating the avoidance path.

Figure 3:
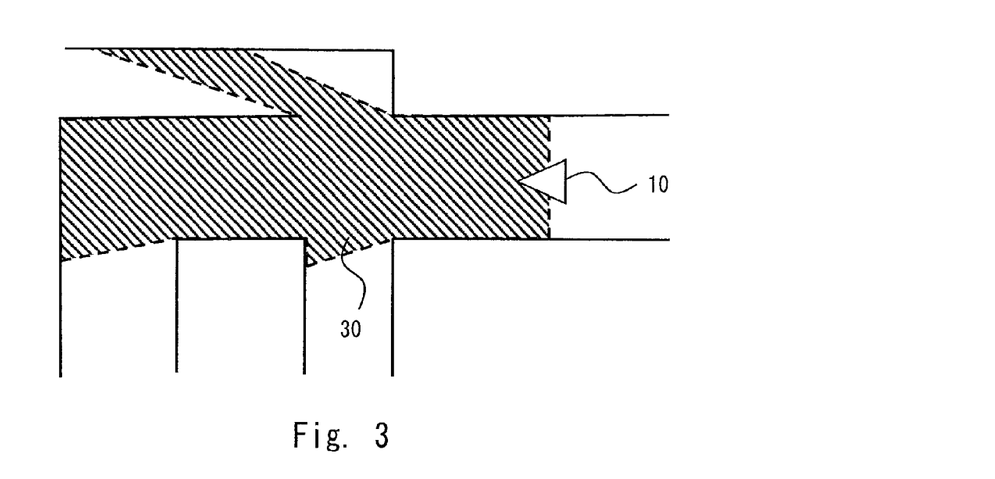
FIG. 3 is a diagram showing a state of measurement of an environment (distance measurement) by a distance measuring sensor 16 according to the first embodiment.
Figure 4:
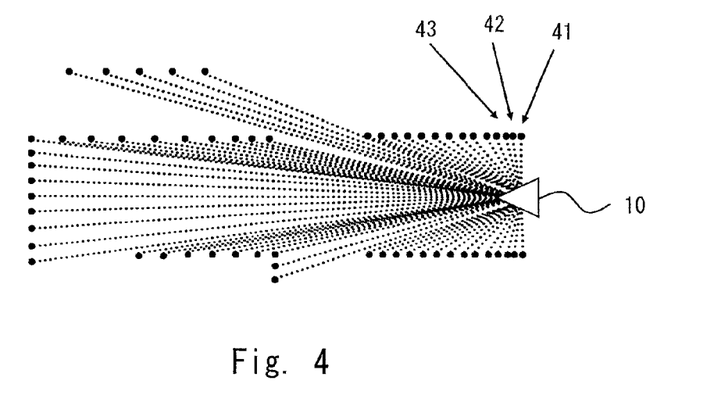
FIG. 4 is a diagram showing measurement points acquired by the distance measuring sensor 16 according to the first embodiment.

Referring to FIGS. 3 and 4, a process for acquiring distance information using the distance measuring sensor 16 is described. FIG. 3 is a diagram showing a state of environment measurement (distance measurement) by the distance measuring sensor 16. FIG. 4 is a diagram showing distance measurement points acquired by the distance measuring sensor 16.

Firstly, the vehicle 10 measures an environment using the distance measuring sensor 16. FIG. 3 shows the state of environment measurement. An area 30 indicated by oblique lines represents a detection area detected by the distance measuring sensor 16. The vehicle 10 acquires measured values, which are obtained from the distance measuring sensor 16 with the position of the vehicle 10 as a reference, as distance information on the measurement points. Thus, each of the measurement points on an obstacle, such as a wall, has distance data with the vehicle 10 as a reference.

FIG. 4 shows the measurement points. Each position of measurement points 41, 42, 43, . . . indicates a distance from the vehicle 10 on a specified plane in the traveling direction of the vehicle 10. Each measurement point has an angular resolution of about 1.

Figure 5:
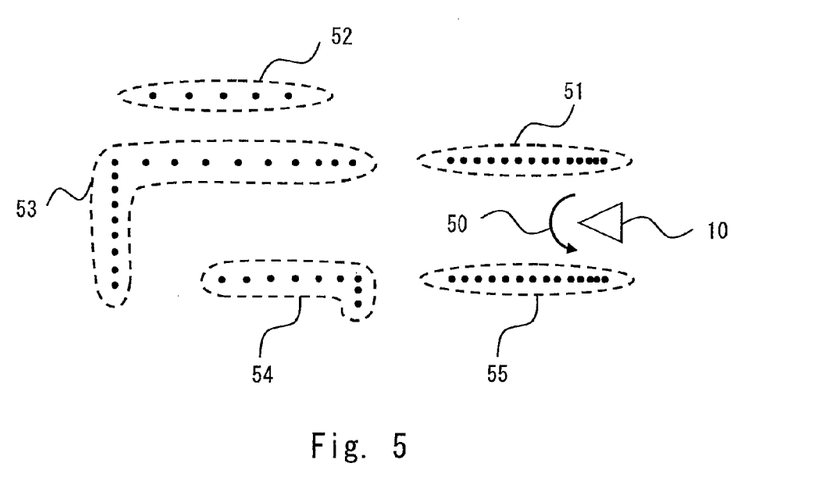
FIG. 5 is a diagram illustrating categorization of measurement points according to the first embodiment.
Figure 6:
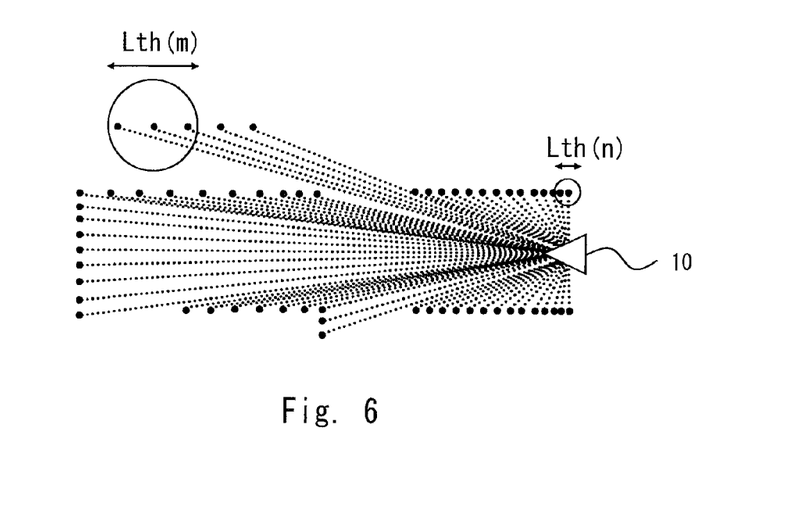
FIG. 6 is a diagram showing changes of thresholds for use in categorizing the measurement points according to the first embodiment.
Figure 7:
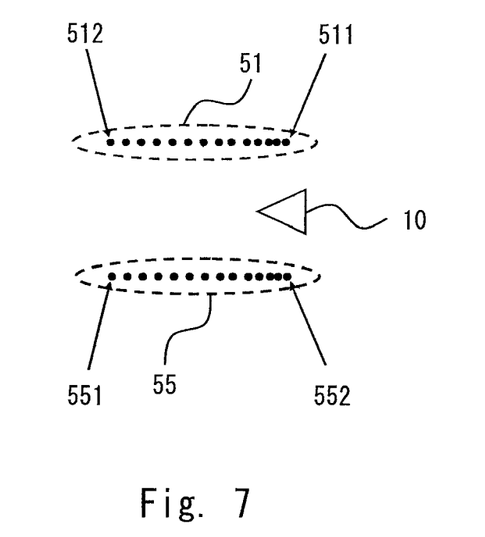
FIG. 7 is a diagram showing start points and end points of objects according to the first embodiment.
Figure 8:
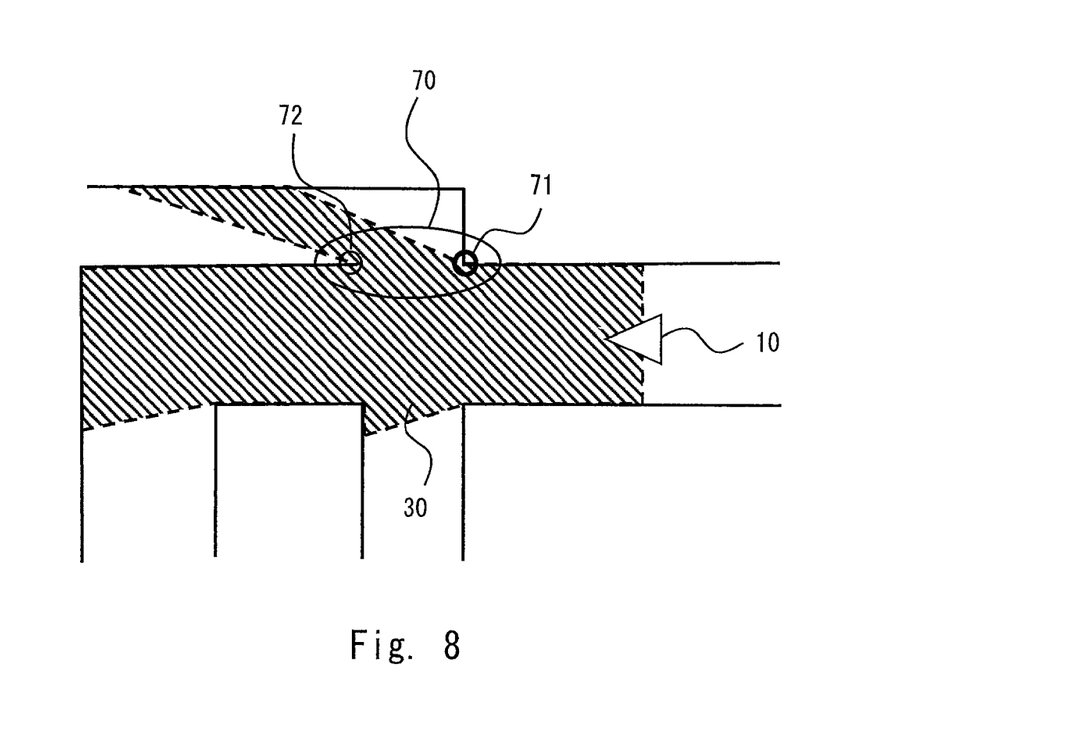
FIG. 8 is a diagram showing discrimination of a dangerous area according to the first embodiment.
Figure 9:
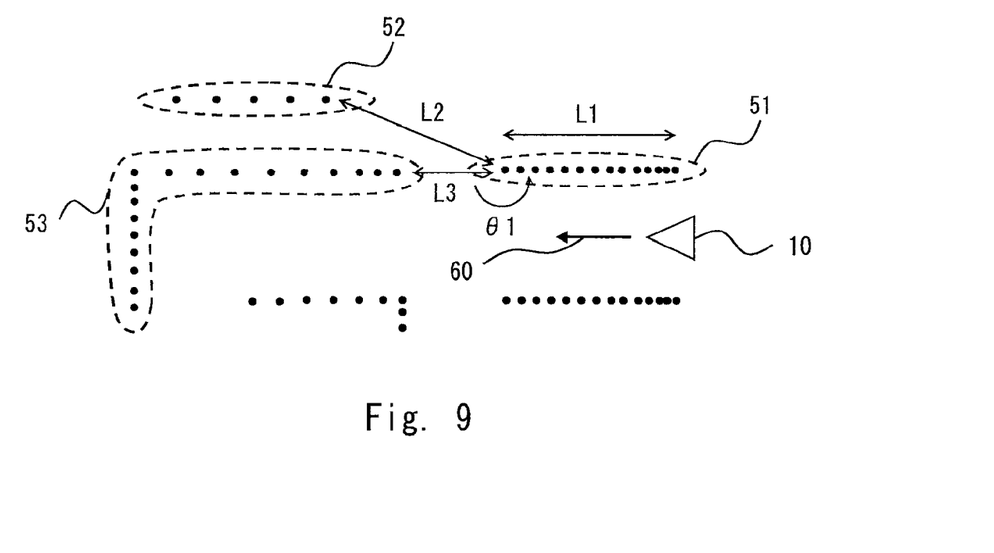
FIG. 9 is a diagram illustrating a specific example of determination of a dangerous area according to the first embodiment.
Figure 10:
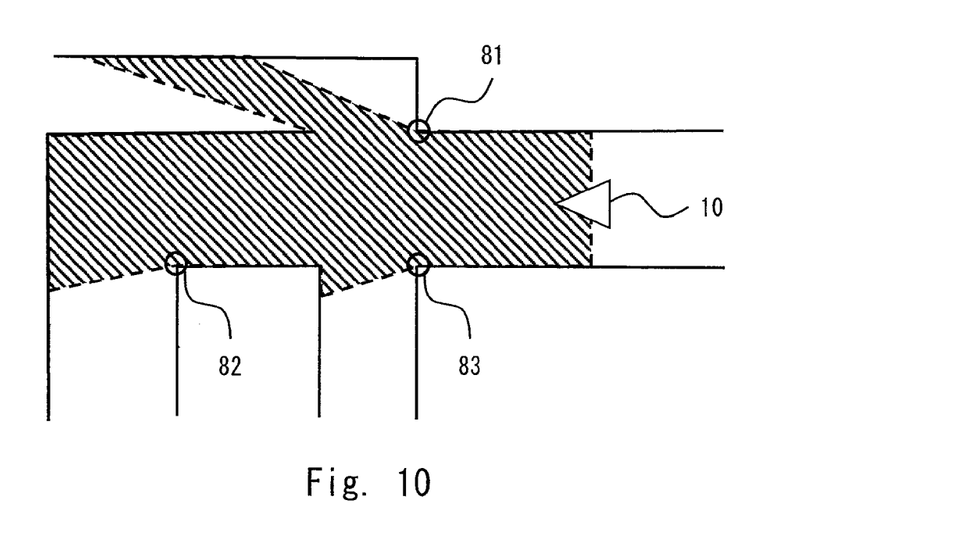
FIG. 10 is a diagram showing extracted dangerous areas according to the first embodiment.
Figure 11A:
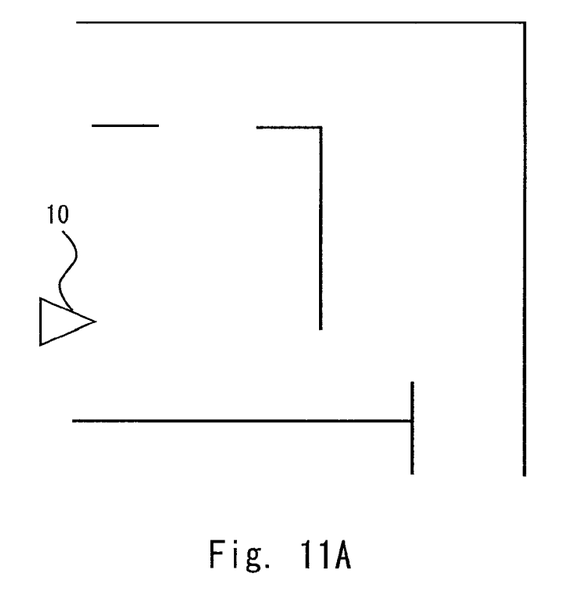
FIG. 11A is a diagram illustrating a dangerous area recognition process in the reverse direction according to the first embodiment.
Figure 11B:
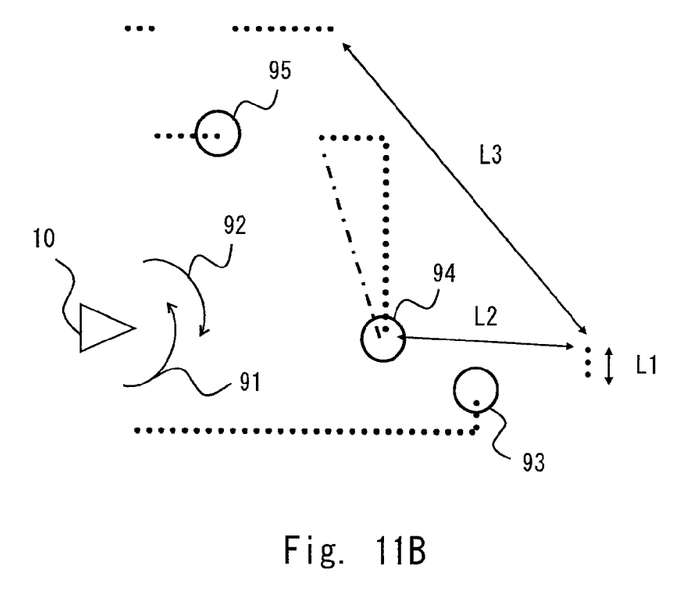
FIG. 11B is a diagram illustrating a dangerous area recognition process in the reverse direction according to the first embodiment.

Referring to FIGS. 5 to 11A and 11B, the dangerous area extraction process is described. FIG. 5 is a diagram illustrating categorization of the measurement points. FIG. 6 is a diagram showing changes of thresholds for use in categorizing the measurement points. FIG. 7 is a diagram showing start points and end points of objects. FIG. 8 is a diagram showing discrimination of a dangerous area. FIG. 9 is a diagram illustrating a specific example of determining a dangerous area. FIG. 10 is a diagram showing an extracted dangerous area. FIGS. 11A and 11B are diagrams each illustrating a dangerous area recognition process in the reverse direction.

The vehicle 10 categorizes (object categorization) based on the measured values of the measurement points acquired from the distance measuring sensor 16. Specifically, it is determined whether the measurement points acquired from the distance measuring sensor 16 are continuously measured on the identical object. When the measurement points are measured on the identical object, a set of these measurement points is discriminated as one object. Herein, as shown in FIG. 5, distances between adjacent measurement points are sequentially determined along an object discrimination process direction 50. When the distance between the measurement points is equal to or smaller than a predetermined threshold, it is determined that the measurement points are measured on the identical object. As for the measurement points, the same object number is given to the measurement points of the same object. In the figure, reference numeral 51 collectively denotes a set of measurement points which are given an object number 1. Also for an object number 2, an object number 3, an object number 4, and an object number 5, a set of measurement points are collectively denoted by reference numerals 52, 53, 54, and 55, respectively.

The predetermined value for the distance between the measurement points may be a fixed value or a value changed according to a distance (measured distance) from the vehicle 10. As shown in FIG. 6, for example, assuming that a threshold Lth(n) is used for measurement points in the vicinity of the vehicle 10 and a threshold Lth(m) is used for measurement points apart from the vehicle 10, the threshold Lth(m) is set to be greater than the threshold Lth(n). Alternatively, a value proportional to a distance to a measurement point, for example, may be simply used as the predetermined threshold. More alternatively, a value proportional to a distance to a measurement point may be used as the threshold until a certain distance from the vehicle 10 is exceeded, and when the certain distance is exceeded, a constant value may be used without changing the threshold any more.

The measurement accuracy of the distance measuring sensor 16 depends on the angular resolution. Accordingly, as the measurement points of the object are distant from the vehicle, the distance between adjacent measurement points increases. As a result, when a fixed value is used as the predetermined threshold for the categorization, there is a possibility of erroneously determining the measurement points of the identical object as measurement points of different objects. Thus, the threshold for use in categorizing the measurement points is changed according to the distance, thereby enabling more accurate discrimination of the distant measurement points of the object in the subsequent dangerous area determination process. This makes it possible to suppress extraction of an erroneous dangerous area. Therefore, the vehicle 10 can be prevented from unnecessarily decelerating or traveling along the avoidance path even though the area is not actually a dangerous area, thereby achieving more stable traveling.

Next, the vehicle 10 obtains a measurement point corresponding to a start point and a measurement point corresponding to an end point of each of the objects categorized by the categorization. Herein, as shown in FIG. 7, as for measurement points positioned at both ends of each object, the measurement point with a smaller measurement number is set as the start point, and the measurement point with a larger measurement number is set as the end point. In the figure, among the measurement points given the object number 1 (in the figure, a set of measurement points denoted by reference numeral 51), a measurement point 511 represents the start point and a measurement point 512 represents the end point. Further, among the measurement points given the object number 5 (in the figure, a set of measurement points denoted by reference numeral 55), a measurement point 551 represents the start point and a measurement point 552 represents the end point. Note that the measurement points are given the measurement numbers in the order of acquisition as illustrated in FIG. 4.

Next, the vehicle 10 discriminates a dangerous area using the start point and the end point of each object. The discrimination of the dangerous area is carried out for each object. Herein, the discrimination is carried out in ascending order of the given object numbers (in the order from the object number 1). Specifically, as for an object with an object number of interest, the end point of the object and the start point of an object with a subsequent object number are focused. When all the following conditions (1) to (4) are satisfied, the endpoint of the object is discriminated as a dangerous area.

Condition 1: As for an object (n) with an object number n, the length of the object (n) is equal to or larger than a threshold. The length of the object (n) is calculated from a distance between a start point and an end point of the object (n). Exceptionally, the object (n) with the object number 1 always satisfies the condition 1. A case where the condition 1 is not satisfied indicates that the length of the object of interest is short. Such an object can be excluded from extraction targets as the dangerous area, because there is little risk of running out.

Condition 2: A distance difference between the end point of the object (n) and a start point of an object (n+1) is equal to or larger than a predetermined threshold. A case where the condition 2 is not satisfied indicates that the width of an opening formed between the objects is narrow. There is no need to extract such an opening as a dangerous area, because a person or a moving obstacle is not likely to run out in the opening.

Condition 3: A distance difference between the end point of the object (n) and a start point of an object (n+2) is equal to or larger than a predetermined threshold. A case where the condition 3 is not satisfied indicates that the width of another opening with the end point of the object (n) as a reference is also narrow. If there are a plurality of openings with the end point of the identical object (n) as a reference, it is assumed that the width of the opening between the object (n) and the object (n+1) is wide, while the width of the opening between the object (n) and the object (n+2) is narrow. Also in this situation, there is no need to extract an opening with a narrow width as a dangerous area, because a person or a moving obstacle is not likely to run out in the opening. That is, the determination of the distance difference between the end point of the object (n) and the start point of the object (n+1), as well as the determination of the distance difference between the end point of the object (n) and the start point of the object (n+2) eliminates the need to extract the end point of the object (n) as a dangerous area, if an opening at least partly having a narrow width with the end point of the object (n) as a reference is included.

Next, the vehicle 10 determines whether the conditions 1 to 3 are satisfied or not for the end point and the start point of each object, and then extracts a dangerous area candidate point from the end point and the start point of each object that satisfies the conditions 1 to 3. Herein, one of the start point of the object (n) and the start point of the object (n+1), which is closer to the vehicle 10, is extracted as the dangerous area candidate point. Note that the predetermined threshold for use in the conditions 1 to 3 is set in consideration of the size of the vehicle 10 and the size of a person, a moving obstacle, or the like.

Next, as for the point extracted as the dangerous area candidate point, the vehicle 10 extracts a dangerous area in consideration of a relative angle between the object including the point and the vehicle 10. Specifically, when the conditions 1 to 3 are satisfied and the following condition 4 is also satisfied for the point extracted as the dangerous area candidate point, the point is discriminated as the dangerous area.

Condition 4: As for a straight line connecting the dangerous area candidate point as a base point and the other endpoint of the identical object, an angle formed between the straight line and the traveling direction of the vehicle 10 is equal to or larger than a predetermined threshold. For example, the predetermined threshold is set to 45 degrees, and it is determined whether the dangerous area candidate point is an endpoint of an object positioned on the front side of the vehicle 10, or is an endpoint of an object positioned on the back side, depending on the establishment of the condition 4. A case where the condition 4 is not satisfied indicates that the dangerous area candidate point is the endpoint of the object positioned on the back side of the vehicle 10. At an intersection, for example, at the endpoint on the front side of the vehicle 10, there is a risk that a moving obstacle such as a person suddenly runs out in front of the vehicle, and both the vehicle 10 and the person are out of sight of each other, which requires special attention. Meanwhile, at the endpoint on the back side, both can see their approaching each other, which makes it possible to take some measures depending on the approaching state. Accordingly, it is considered that the necessity of attention at the endpoint on the back side is less than that of the endpoint on the front side. Thus, it is further determined whether the dangerous area candidate point is the endpoint on the front side or the endpoint on the back side when viewed from the vehicle 10, thereby enabling extraction of only a more dangerous area.

As shown in FIG. 8, for example, when an end point 71 and a start point 72 which form an opening 70 such as a passage are extracted as dangerous area candidate points, the end point 72 on the back side, which is less dangerous, is not extracted as the dangerous area, and the end point 71 on the front side, which is more dangerous, is extracted as the dangerous area. This eliminates the need to unnecessarily determine the dangerous area at the endpoint on the back side, thereby making it possible to avoid wasteful deceleration and avoidance operation in the subsequent travel.

Referring to FIG. 9, a specific example of the dangerous area determination is described. The figure shows a case where the object number n is 1.

Condition 1: As for the object (denoted by reference numeral 51 in the figure) with the object number 1, the object has a length L1 equal to or greater than a predetermined threshold (which is always satisfied when n=1).

Condition 2: A distance difference L2 between the end point of the object with the object number 1 and the start point of the object (denoted by reference numeral 52 in the figure) with the object number 2 is equal to or greater than a predetermined threshold.

Condition 3: A distance difference L3 between the end point of the object with the object number 1 and the start point of the object (denoted by reference numeral 53 in the figure) with the object number 3 is equal to or greater than a predetermined threshold.

Condition 4: As for a straight line connecting the end point and the start point of the object with the object number 1, an angle θ1 formed between the straight line and a traveling direction 60 of the vehicle 10 is equal to or larger than a predetermined threshold.

In the example shown in FIG. 9, all the conditions 1 to 4 are satisfied, and the end point of the object number 1 is extracted as a dangerous area. Subsequent to the dangerous area determination for the endpoint of the object with the object number 1, a pair of the end point of the object with the object number 2 and the start point of the object with the object number 3 are focused. Then, the conditions 1 to 3 are satisfied, and the start point of the object with the object number 3, which is closer to the vehicle 10, is extracted as a dangerous area candidate point. However, in the determination as to the condition 4, the angle formed between the direction of the object with the object number 3 and the traveling direction of the vehicle 10 is smaller than the predetermined threshold, so that the condition 4 is not satisfied. Therefore, the start point of the object with the object number 3 is not extracted as a dangerous area.

FIG. 10 shows an extraction result of dangerous areas in the environment shown in FIG. 3. In the example shown in the figure, dangerous areas 81, 82, and 83 are extracted. Thus, the vehicle 10 extracts the dangerous areas by determining the establishment of the conditions 1 to 4. Locations of dangerous areas include an area where the vehicle 10 can hardly see a moving object such as a person running out in front of the vehicle, and an area having such a width as to be able to assume that a moving obstacle runs out in front of the vehicle. Therefore, when each of the detected objects in the environment has a certain size and the opening between the objects has a certain width, the endpoint of the object is extracted as a candidate of the dangerous area. The dangerous area may be extracted by making determination of only the conditions 1 to 3. However, when determination is also made as to the establishment of the condition 4, wasteful deceleration and avoidance operation can be further suppressed.

As shown in FIG. 5, the determination of the conditions 1 to 4 is carried out in ascending order of the given object numbers (i.e., in the order from the object number 1) along the object discrimination process direction 50. Alternatively, the determination of the conditions 1 to 4 may be carried out again for each object in descending order of the given object numbers. This makes it possible to extract the dangerous area more accurately. Referring to FIGS. 11A and 11B, the reasons for this are described below.

FIG. 11B shows an extraction result of dangerous area candidate points in the real environment as shown in FIG. 11A. In the example shown in the figure, when the dangerous area candidate point is extracted along an object discrimination process direction 92, an endpoint 94 does not satisfy the condition 1 (L1 is smaller than the predetermined threshold). Accordingly, the endpoint 94 is not extracted as a dangerous area. Meanwhile, when the dangerous area candidate point is extracted along an object discrimination process direction 91, the endpoint 94 satisfies all the conditions 1 to 4. Accordingly, the endpoint 94 can be extracted as a dangerous area. Note that when the dangerous area candidate point is extracted along the object discrimination process direction 92, the discrimination process is carried out by replacing the start point and the end point of the object with the end point and the start point thereof.

Figure 12:
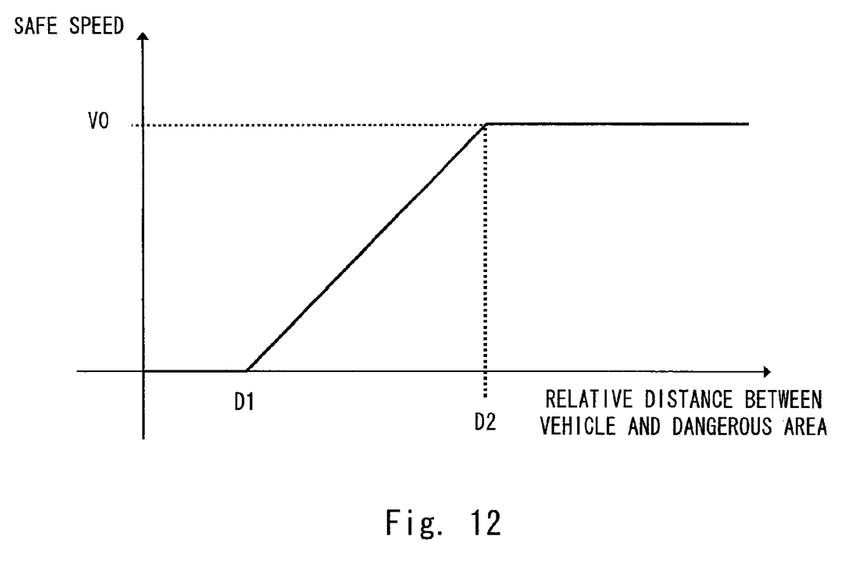
FIG. 12 is a graph showing a deceleration table for use in selecting a safe speed according to the first embodiment.

Referring to FIG. 12, a safe speed selection process is described. FIG. 12 is a graph showing a deceleration table for use in selecting a safe speed.

The vehicle 10 selects a safe speed capable of avoiding a collision even if a moving obstacle such as a person runs out in front of the vehicle, in consideration of the distance from the dangerous area located closest to the vehicle 10 among the extracted dangerous areas. Herein, the safe speed can be calculated using the deceleration table as shown in FIG. 12, for example.

FIG. 12 shows a safe speed V0 and relative distances D1 and D2, assuming that the vertical axis represents a safe speed and the horizontal axis represents a relative distance between the vehicle 10 and a dangerous area. The relative distance D1 is a value set in consideration of the size of each of the moving obstacle and the vehicle 10 with the dangerous area as a reference position. The vehicle 10 stops at the relative distance D1 and at a speed of 0. The relative distance D2 is a distance necessary for allowing the vehicle 10 to stop at the relative distance D1 so as to reach the speed of 0, and is set depending on the performance of the vehicle 10. That is, the vehicle 10 travelling at the relative distance D2 and at the speed of V0 decelerates as it approaches the dangerous area, and stops at the relative distance D1. The vehicle 10 selects the safe speed according to the relative distance with the dangerous area by referring to the deceleration table shown in FIG. 12.

As described later, when extracting an dangerous area, the vehicle 10 creates a path for avoiding the dangerous area and travels along the path. This makes it possible to avoid a collision in the running-out area. Thus, in the case of traveling along the created avoidance path, the vehicle may accelerate to travel along the avoidance path, instead of decelerating as it approaches the dangerous area. This allows the vehicle to travel more swiftly to the destination.

Figure 13:
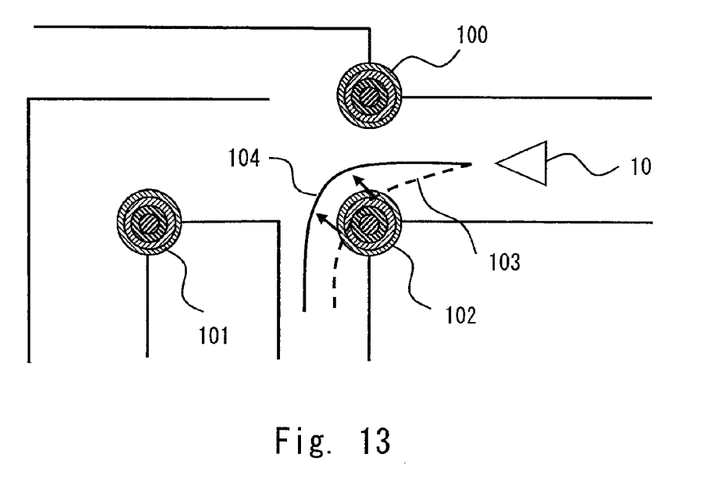
FIG. 13 is a diagram showing setting of a potential to each dangerous area according to the first embodiment.
Figure 14:
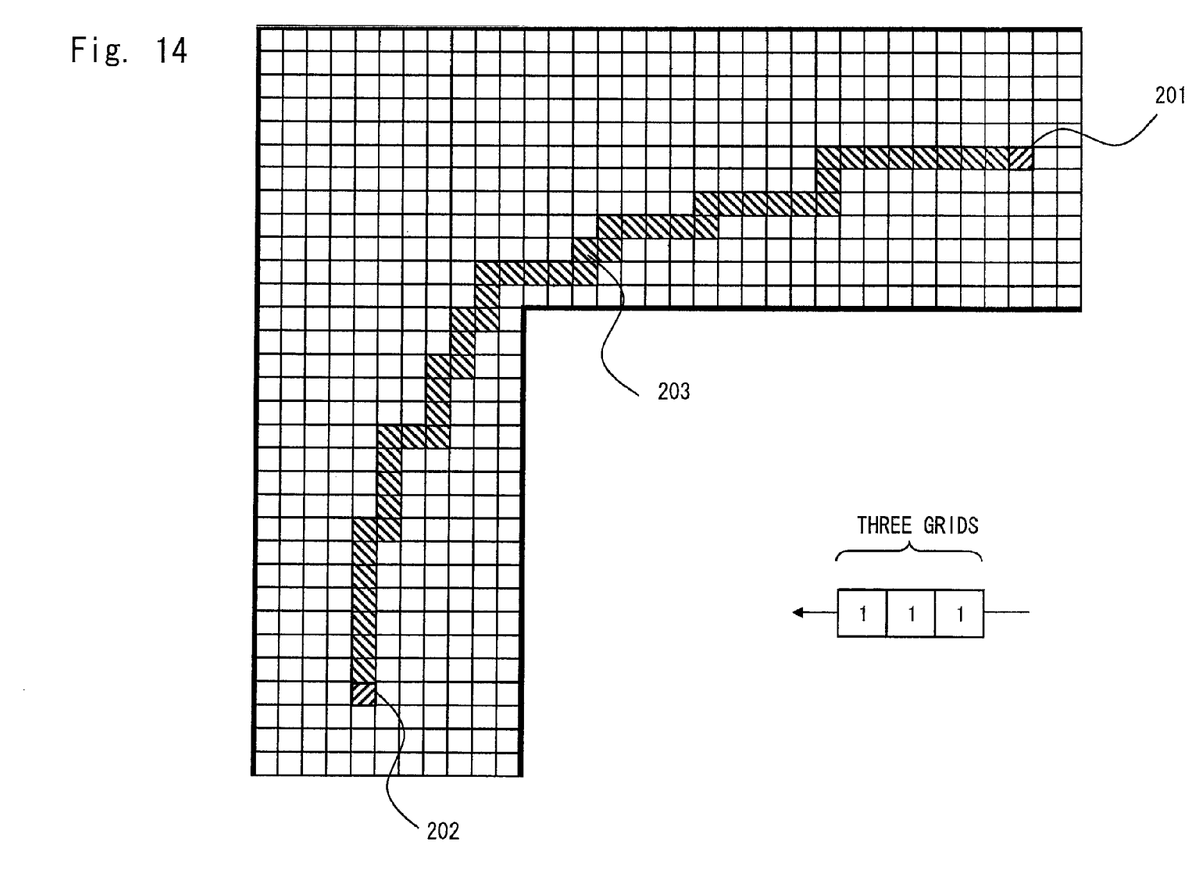
FIG. 14 is a diagram showing path planning using a grid map according to the first embodiment.
Figure 15:
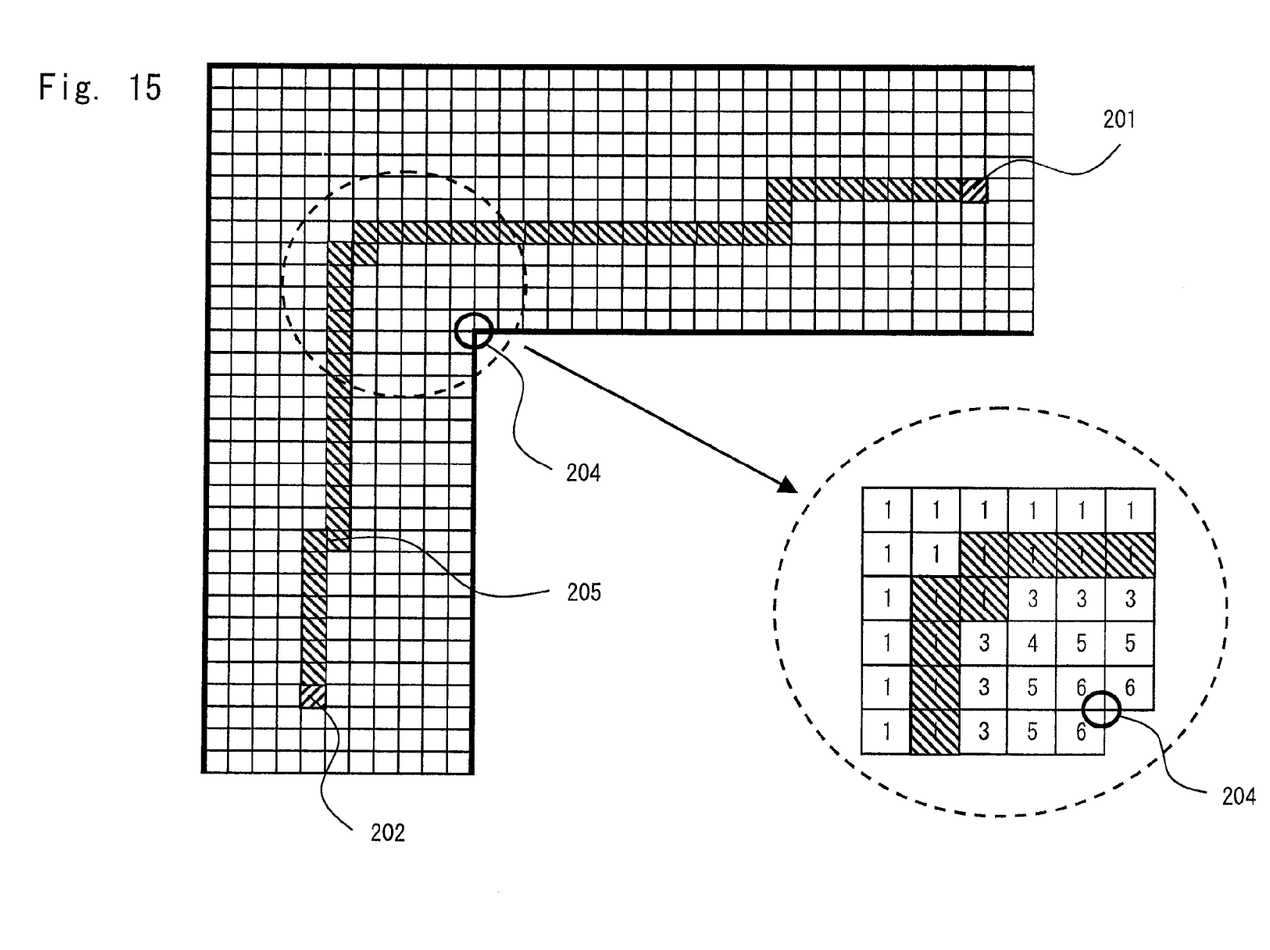
FIG. 15 is a diagram showing path planning using a grid map reflecting a dangerous area according to the first embodiment.

Referring to FIGS. 13 to 15, a path planning process is described. FIG. 13 is a diagram showing setting of a potential to each dangerous area. FIG. 14 is a diagram showing path planning using a grid map. FIG. 15 is a diagram showing path planning using a grid map reflecting the dangerous area.

The vehicle 10 carries out path planning to avoid the extracted dangerous area. Herein, path planning is performed to avoid the extracted dangerous area. Specifically, a potential is set to peripheral coordinates with the extracted dangerous area as a center. In the potential region to which the potential is set, the coordinates are weighted with a potential value larger than that of other areas, and a larger potential value is set as being closer to the center of the region. This prevents the dangerous area from being easily adopted as a path, thereby enabling creation of a path for more reliably avoiding the dangerous area in the path planning.

As shown in FIG. 13, when dangerous areas (100, 101, and 102) are not taken into consideration, the vehicle 10 creates a path 103 indicated by a dashed line in the path planning. Meanwhile, when the path planning is performed in consideration of the dangerous area 102, a path 104 indicated by a solid line can be created. The path 104 is a path which curves more sharply at the corner in the vicinity of the dangerous area 102 than the path 103, and which allows the vehicle 10 to more reliably avoid a crossing collision. That is, in the path 103, it is necessary to perform a collision avoidance operation immediately before or after the vehicle 10 turns left. Meanwhile, in the path 104, the vehicle 10 can pass through the dangerous area 102 after turning left to check the traveling direction, which allows safer travel.

Note that a well-known method can be employed as a method for path planning. For example, path planning is performed using a grid map 200 shown in FIG. 14. In the figure, a cost necessary for moving one grid is set to each grid. For example, the cost necessary for passing through three grids as shown in the lower right of the figure is "3". The vehicle 10 searches a shortest path based on the cost. In the path planning, the total cost of grids on a path connecting a travel start point 201 and a travel end point 202 is calculated, and a path with a minimum cost is adopted among a plurality of paths. When no dangerous area is extracted, a path 203 with a minimum cost is created as shown in FIG. 14. When a dangerous area is extracted, as shown in FIG. 15, for example, the path with the minimum cost is changed by setting a cost value for grids in an extracted dangerous area 204 and grids in the vicinity thereof to be larger than that for other grids, thereby making it possible to create a path 205 for avoiding the dangerous area 204.

As described above, according to the present invention, the running-out dangerous area is estimated using the measured values of the distance measuring sensor 16, and the speed is decreased in the case of entering the dangerous area, or a path for avoiding the dangerous area is created to travel along the created path. This makes it possible to stably avoid a collision with a moving obstacle without the need to install an infrastructure or the like even in the running-out dangerous area.

Moreover, according to the present invention, there is no need to preliminarily set dangerous areas in the map information and there is no need for advance preparation such as infrastructure construction. Therefore, the present invention can easily be applied to various environments.

The present invention is not limited to the above embodiments, but can be modified as appropriate without departing from the scope of the present invention.

Figure 16:
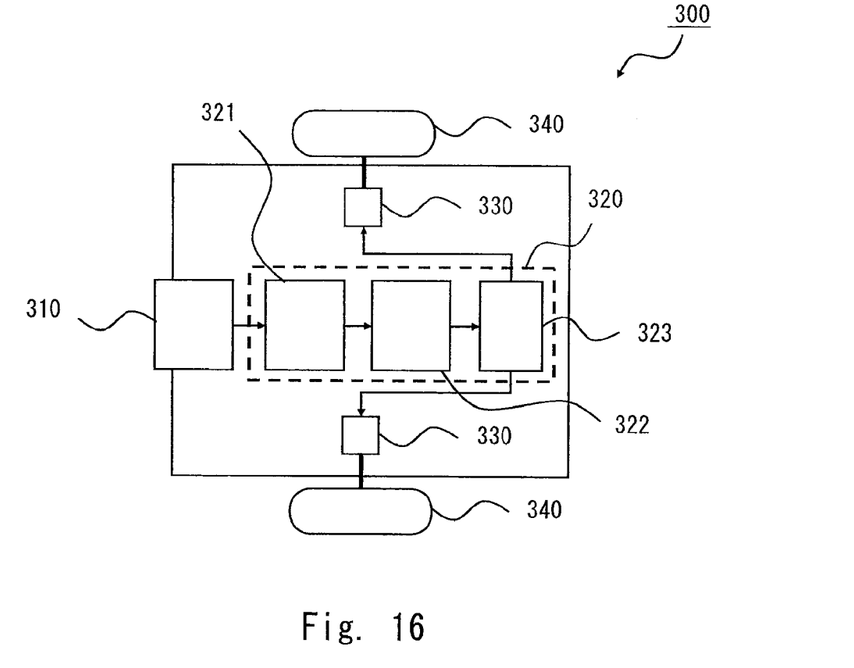
FIG. 16 is a diagram showing a structure of an autonomous moving body according to other embodiment.

Although in the above-mentioned embodiments, the vehicle 10 shown in FIG. 1 is illustrated as the autonomous moving body, for example, the structure of the autonomous moving body is not particularly limited, as long as it can detect a dangerous area using the distance measuring sensor 16 mounted therein. For example, an inverted two-wheel type autonomous moving body having a structure as shown in FIG. 16 may also be employed. The autonomous moving body shown in FIG. 16 includes a laser range finder 310 serving as the distance measuring sensor 16, a CPU 320 serving as the control unit 15, wheels 340, and motors 330 for driving the wheels 340. The CPU 320 includes a dangerous area extraction unit 321, a safe speed selection unit 322, and a wheel speed output unit 323. These components have functions similar to those of the functional parts described in the above embodiments.

Figure 17:
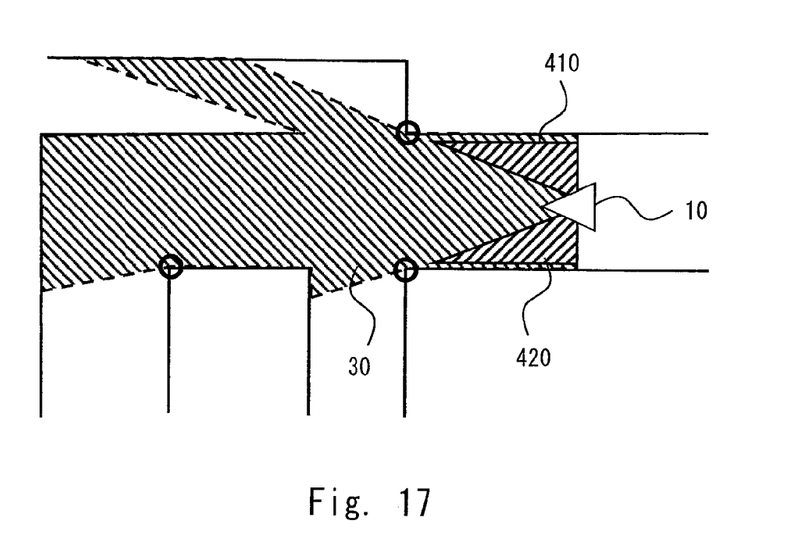
FIG. 17 is a diagram showing a state in which a range of monitoring dangerous areas is limited according to other embodiment.

Further, as shown in FIG. 17, the range for monitoring dangerous areas may be limited. When the vehicle 10 is structured to decelerate according to a relative distance from a dangerous area closest to the vehicle 10 among the extracted dangerous areas, the vehicle is to decelerate to avoid also a dangerous area which is located slightly farther from the closest dangerous area. As a result, the vehicle 10 cannot increase the traveling speed in some cases. For this reason, dangerous areas which are apart from the vehicle to a certain degree among the extracted dangerous areas are excluded from the targets to select the speed using the deceleration table. In short, only the dangerous areas included in regions 410 and 420, each of which is indicated by oblique lines in FIG. 17, are set as deceleration targets. By limiting the monitoring area for determining the dangerous areas as deceleration targets, the number of areas to be determined as the dangerous areas is reduced, thereby suppressing the frequency of the deceleration operation. Consequently, it is possible to provide a collision avoidance function specialized in avoiding a crossing collision.

INDUSTRIAL APPLICABILITY

The present invention is applicable to an autonomous moving body that autonomously travels in an environment including a dangerous area where running out is likely to occur, for example, and to a control method thereof.

REFERENCE SIGNS LIST

10 VEHICLE
10a VEHICLE BODY,
11 RIGHT/LEFT DRIVE WHEELS
12 CASTER
13 DRIVE UNIT (MOTOR)
14 ENCODER
15 CONTROL UNIT
15a STORAGE AREA
16 DISTANCE MEASURING SENSOR
21 DISTANCE INFORMATION ACQUISITION UNIT
22 DANGEROUS AREA EXTRACTION UNIT
23 SAFE SPEED SELECTION UNIT
24 PATH PLANNING UNIT
25 WHEEL SPEED OUTPUT UNIT
30 DETECTION AREA
41, 42, 43 MEASUREMENT POINT
50, 60 OBJECT DISCRIMINATION PROCESS DIRECTION
51 SET OF MEASUREMENT POINTS GIVEN OBJECT NUMBER 1
511 START POINT
512 END POINT
52 SET OF MEASUREMENT POINTS GIVEN OBJECT NUMBER 2
53 SET OF MEASUREMENT POINTS GIVEN OBJECT NUMBER 3
54 SET OF MEASUREMENT POINTS GIVEN OBJECT NUMBER 4
55 SET OF MEASUREMENT POINTS GIVEN OBJECT NUMBER 5
551 START POINT
552 END POINT
70 OPENING
71 END POINT
72 START POINT
81, 82, 83 DANGEROUS AREA
100, 101, 103 DANGEROUS AREA
102, 103 PATH
200 GRID MAP
201 TRAVEL START POINT
202 TRAVEL END POINT
203 PATH
204 DANGEROUS AREA
205 PATH
310 LASER RANGE FINDER
320 CPU
330 MOTOR
340 WHEEL
321 DANGEROUS AREA EXTRACTION UNIT
322 SAFE SPEED SELECTION UNIT
323 WHEEL SPEED OUTPUT UNIT
410, 420 MONITOR AREA

The invention claimed is:

1. An autonomous moving body that autonomously travels from a travel start point to a travel end point in an environment, comprising:
  a distance measuring sensor that measures distances to a plurality of objects existing in the environment;
  a control unit, the control unit further comprising an acquisition unit and an extraction unit that extracts an endpoint of the object as a collision point with the moving body, the control unit programmed to:
    acquire distance measurement values as distance information on a plurality of measurement points measured by the distance measuring sensor, wherein if distances between measurement points of the plurality of measurement points are equal to or smaller than a predetermined threshold, the measurement points are categorized as being one object;
    extract a candidate point as the collision point from an end point and a start point of each of the plurality objects that satisfies all of the following conditions (1) to (3):
    (1) as for an object (n) with an object number n, the length of the object (n) is equal to or larger than a fixed preprogrammed threshold length, wherein the length of the object (n) is calculated from a distance between the start point and the end point of the object (n);
    (2) a distance difference between the end point of the object (n) and a start point of another object (n+1) of the plurality of objects is equal to or larger than a second fixed preprogrammed threshold length, which indicates a potentially dangerous area; and
    (3) a distance difference between the end point of the object (n) and a start point of an object (n+2) is equal to or larger than a third fixed preprogrammed threshold length, which further indicates the potentially dangerous area, and
    designate the candidate point as the endpoint of the object as the collision point if the following condition (4) is satisfied:
    (4) providing an imaginary straight line connecting the candidate point as a base point and an endpoint of the object, and determining whether an angle between the straight line and the traveling direction of the vehicle, in a plane defined by the imaginary straight line and the traveling direction of the vehicle, is equal to or larger than a fixed preprogrammed threshold angle,
  wherein the autonomous moving body travels so as to avoid a collision in the one or more designated endpoints of the objects.

2. The autonomous moving body according to claim 1, wherein the control unit further comprises a safe speed selection unit which selects a traveling speed to decelerate according to a relative distance between the one or more designated endpoints of the objects and a position of the autonomous moving body when the autonomous moving body enters the one or more endpoints of the objects extracted by the extraction unit,
  wherein the autonomous moving body enters the endpoints of the objects according to the traveling speed selected by the safe speed selection unit.

3. The autonomous moving body according to claim 1, wherein the control unit further comprises a path planning unit that creates a path from the travel start point to the travel end point, wherein when the autonomous moving body travels to avoid the one or more endpoints of the objects extracted by the extraction unit, the path planning unit creates a path for avoiding the endpoints of the objects using map information reflecting the endpoints of the objects, and the autonomous moving body travels along the created path.

4. The autonomous moving body according to claim 1, wherein the control unit is programmed to extract and designate the candidate point free of any pre-installed infrastructure.

5. A control method for an autonomous moving body including a distance measuring sensor that measures a distance to an object existing in an environment and a control unit including a distance acquisition unit and a unit that extracts an endpoint of the object as a collision point with a moving body, the control method comprising:
  measuring distances to a plurality of objects existing in the environment with the distance measuring sensor;
  acquiring distance measurement values as distance information on a plurality of measurement points measured by the distance measuring sensor with the control unit,
  categorizing, with the control unit, the measuring points as being one object if distances between measurement points of the plurality of measurement points are equal to or smaller than a predetermined threshold;
  extracting, with the control unit, a candidate point as the collision point from an end point and a start point of each of the plurality objects that satisfy all of the following conditions (1) to (3):
    (1) as for an object (n) with an object number n, the length of the object (n) is equal to or larger than a fixed preprogrammed threshold length, wherein the length of the object (n) is calculated from a distance between the start point and the end point of the object (n);
    (2) a distance difference between the end point of the object (n) and a start point of another object (n+1) of the plurality of objects is equal to or larger than a second fixed preprogrammed threshold length, which indicates a potentially dangerous area; and
    (3) a distance difference between the end point of the object (n) and a start point of an object (n+2) is equal to or larger than a third fixed preprogrammed threshold length, which further indicates the potentially dangerous area, and
  designating, with the control unit, the candidate point the endpoint of the object as the collision point if the following condition (4) is satisfied:
    (4) providing an imaginary straight line connecting the candidate point as a base point and an end point of the object, and determining whether an angle between the straight line and the traveling direction of the vehicle, in a plane defined by the imaginary straight line and the traveling direction of the vehicle, is equal to or larger than a fixed preprogrammed threshold angle,
  wherein the autonomous moving body travels so as to avoid a collision in the one or more designated endpoints of the objects.

6. The control method for an autonomous moving body according to claim 5, wherein in the extraction of the endpoints of the objects, assuming that the endpoint of the object extracted as the collision point is a candidate point, it is determined whether an angle formed between a straight line connecting the candidate point as a base point and another endpoint of the identical object and a traveling direction of the autonomous moving body is equal to or larger than a predetermined threshold; and when the angle is equal to or larger than the predetermined threshold, the candidate point is extracted as a collision point.

7. The control method for an autonomous moving body according to claim 5, wherein when the autonomous moving body enters the endpoints of the objects, a traveling speed to decelerate according to a relative distance between the endpoints of the objects and a position of the autonomous moving body is selected, and the autonomous moving body travels according to the selected traveling speed.

8. The control method for an autonomous moving body according to claim 5, wherein when the autonomous moving body travels to avoid the endpoints of the objects, a path for avoiding the endpoints of the objects is created using map information reflecting the endpoints of the objects, and the autonomous moving body travels along the created path.

9. The control method for an autonomous moving body according to claim 5, wherein when the autonomous moving body approaches the endpoints of the objects, the autonomous moving body decelerates according to a relative distance between the endpoints of the objects and a position of the autonomous moving body, or travels along a path for avoiding the endpoints of the objects.

10. The control method for an autonomous moving body according to claim 5, wherein the control unit is programmed to extract and designate the candidate point free of any pre-installed infrastructure.

* * * * *